United States Patent
Grobecker et al.

[19]

[11] Patent Number: 5,813,526
[45] Date of Patent: Sep. 29, 1998

[54] HOUSING

[75] Inventors: Hermann Grobecker, Garbsen; Henning Wilhelm, Lehrte/Aligse, both of Germany

[73] Assignee: U.S. Philips Corporation, New York, N.Y.

[21] Appl. No.: 785,148

[22] Filed: Jan. 13, 1997

[30] Foreign Application Priority Data

Jan. 12, 1996 [DE] Germany .......................... 196 00 874.3
May 24, 1996 [DE] Germany .......................... 196 20 983.8

[51] Int. Cl.⁶ .................................................. B65D 85/30
[52] U.S. Cl. ......................... 206/308.1; 206/310; 206/312
[58] Field of Search ................................. 206/308.1, 309, 206/310, 312, 493

[56] References Cited

U.S. PATENT DOCUMENTS

| | | | |
|---|---|---|---|
| 4,535,888 | 8/1985 | Nusselder | 206/311 |
| 5,238,107 | 8/1993 | Kownacki | 206/308.1 |
| 5,244,085 | 9/1993 | Lammerant et al. | 206/309 |
| 5,322,162 | 6/1994 | Melk | 206/311 |
| 5,417,324 | 5/1995 | Joyce et al. | 206/307 |
| 5,494,156 | 2/1996 | Nies | 206/493 |
| 5,626,225 | 5/1997 | Joyce, Jr. | 206/308.1 |
| 5,682,991 | 11/1997 | Lammerant et al. | 206/308.1 |

FOREIGN PATENT DOCUMENTS 3425579C   1/1986   Germany .
8711339.2  2/1988   Germany .

Primary Examiner—Paul T. Sewell
Assistant Examiner—Nhan T. Lam
Attorney, Agent, or Firm—Leroy Eason

[57] ABSTRACT

A housing for storing a stack of at least two information discs such as CDs includes a central retaining device for engaging and securely fastening each of the discs. The retaining device consists of a plurality of clamping studs arranged in a circle, and with respective groups of studs being in respective planes, each such plane being for a respective disc. The studs are resilient in the radial direction and those in a given group engage the central opening of the disc to be stored in the relevant plane.

13 Claims, 8 Drawing Sheets

HOUSING

BACKGROUND OF THE INVENTION

1. Field of the Invention

The invention relates to a housing with a central retaining device for at least two information discs, for example CDs, lying one above the other and each having a central opening, which retaining device is arranged on a base plate.

2. Description of the Related Art

Such a housing is known from, for example, published German application DE-GM 87 11 339. The known housing has a bottom part, a lid hinged thereto, and a moulded part which can be inserted into the bottom part and which has a circular depression and a projection which enters the central holes of information discs. The depth of the circular depression in the known construction and the length of the projection are a multiple of the thickness of an information discs. Furthermore, the circular depression is provided with an edge support which is raised above the bottom of the bottom part or of the moulded part and which adjoins the wall of the circular depression. The projection passing through the central holes of the discs lying on top of one another in the known construction is of a rigid construction and has surfaces which extend perpendicularly to the surface of the bottom part. Accordingly, there is no possibility of fastening the stacked discs by means of the rigid projection through clamping or a similar action in this known construction.

SUMMARY OF THE INVENTION

The invention has for its object to improve the known construction by providing a special arrangement of the central retaining device which renders possible an individual clamping of the stacked information carriers.

According to the invention, this object is achieved in a housing of the kind mentioned in the opening paragraph in that a) the retaining device is built up from clamping studs which are arranged in a circle, grip into the central openings, and are resilient in the radial direction, and b) at least two groups of independent clamping studs are provided, each group with clamping surfaces arranged in a different plane for clamping a respective information disc.

It is possible in this manner to fasten each of the stacked, disc-shaped information carriers individually by the clamping action of the specially designed clamping studs without the clamping studs of the one group detracting from or interfering with the clamping action of another group. Dropping out of the information carriers when the lid is opened is avoided thereby, while in addition the individual clamping of the information carriers substantially prevents a circular movement of the information carriers during transport such as is possible, for example, in the known construction mentioned above where the information carriers are passed loosely over the projection. Sticking together of several stacked discs is prevented, when the information carriers used are, for example, commercially available CDs, in that the commercially available CDs are at present each provided with a projecting ring adjoining the central opening at their laser read-out sides. The interspacings of the planes comprising the clamping surfaces are then adapted to the thickness of the information carriers to be clamped, i.e. inclusive of any rings which may be present.

To prevent sagging of the bottom information disc provided with such a ring in one arrangement of several information discs, an embodiment of the invention the otherwise planar lower support surface of the base plate is provided with an elevation in its edge region whose height is equal to the height of the ring present on the information carrier.

A chamfer-type clamping between the information disc and the clamping studs is achieved in a further embodiment of the invention in that the clamping surfaces each lying in an individual plane are given a tapering shape in the direction of the base plate such that the greatest outer diameter of the clamping surfaces arranged in a circle is slightly greater than the diameter of the central opening of the relevant clamped information disc.

To prevent the clamping studs of the individual groups from influencing one another, a further embodiment of the invention is characterized in that the surfaces of the clamping studs adjoining the clamping surfaces of a group extend perpendicularly to the base plate, and the outer diameter of the former surfaces is somewhat smaller than the diameter of the central opening of the information discs.

An improved separation between the individual clamping planes is in addition achieved in that radial ridges of a diameter somewhat greater than the diameter of the central openings of the information carriers are provided at the ends of the clamping surfaces of a group of clamping studs. When an information disc is passed over the clamping studs, these ridges cause the relevant clamping studs to be pressed somewhat inwards, whereupon they spring back into their clamping position after the information carrier has reached its clamping position.

A further embodiment of the invention is characterized in that the clamping studs of the individual groups from among two or more groups of different clamping studs are arranged in alternation one after the other distributed over the circular circumference. At least three clamping studs regularly distributed over the circumference are necessary for each group in order to achieve an effective clamping. For example, if there is a total of twelve clamping studs, a maximum of four disc-shaped information carriers can be securely clamped and held each by means of three clamping studs exclusive to the relevant disc and evenly distributed over the circumference. If three information discs are to be accommodated by means of a total of twelve clamping studs, four clamping studs will be available for each disc, while in the case of two information discs each disc will have six clamping studs at its disposal.

The invention may be used to advantage in a commercially available housing with a bottom part, a lid hinged thereto, and a tray which can be inserted into the bottom part and which is shaped so as to form the base plate with the central retaining device according to the invention as defined above, while the housing remains unchanged in other respects. Depending on the construction of the known tray, it is now possible to accommodate a maximum of three disc-shaped information carriers in the housing without the necessity of changing the exterior dimensions thereof, the bottom part and the lid of the known commercially available housing remaining of the same construction. This constitutes a major space saving compared with the known housing which is capable of accommodating only one information carrier.

In a first embodiment thereof, the known tray is provided with a plane support surface for the bottom information carrier and an also plane outer surface for resting against the bottom part of the housing, while a raised central support surface is dispensed with. Space is thus gained without further changes in the tray or the housing, so that two information carriers can be individually and securely clamped, while at the same time the space available for a booklet above the retaining device can be maintained unrestricted.

A second embodiment is characterized in that in addition to the above changes in the tray the clamping studs of the retaining device are lengthened in the direction of the lid. Three information discs can be securely clamped in this embodiment, but the space for accommodating the booklet between the clamping studs and the lid is reduced here if the exterior dimensions of the housing remain unchanged.

A further application of the invention is found in a commercially available housing with a bottom part and a lid hinged thereto, where the bottom part is arranged so as to form the base plate with the central retaining device according to the invention described above, the other dimensions of the housing remaining the same, and where the clamping studs starting from the bottom part extend to just below the lid. In such an embodiment of the invention, a maximum of four information carriers can be accommodated one above the other, individually clamped, in a housing which was originally capable of holding only one information carrier, without the dimensions of the outer housing, i.e. of the bottom part or the lid, having to be changed. Such an embodiment of the invention is favourable, for example, as a bulk packing for data carriers which do not require a special text booklet, since such a text booklet can no longer be accommodated because of the reduced space between the lid and the upper edge of the retaining device.

Impact loads cannot be avoided, however, in the transport of such housings with, for example, four information carriers on one and the same clamping device, so that the uppermost information carrier could possibly become detached from the retaining device. It may also happen that one or several clamping elements break off in the case of multiple impacts. This means that the information carriers can no longer be securely held under certain circumstances.

Published German application DE 34 25 579 C2 discloses a storage cassette for disc-shaped information carriers, for example for CDs, in which the central retaining device comprises radially resilient clamping studs which are designed for holding a single CD. To prevent the CD getting loose, for example owing to an impact, the ends of the clamping studs are fixedly interconnected by a pressure plate such that the retaining device of this construction has a reduced diameter in the case of a pressure load on the pressure plate in dependence on its elastic deformation, while the clamping studs are provided with retaining or positioning projections by means of which the retaining device fixes the deposited information carrier into place by interlocking with its central hole edge region. Such a construction renders it possible for the retaining device gripping into the central hole of the information plate to be easily reduced in diameter. The information carrier may thus be pushed home on the retaining device with a slight pressure, whereupon a secure fixation between the retaining device and the information disc can be achieved owing to their interlocking shapes. Conversely, the information disc can only be detached through the exertion of a slight pressure on the pressure plate, whereby the diameter of the retaining device is reduced and the disc can be subsequently removed. This effect can be further improved in the known construction by fastening the clamping studs to the pressure plate via connection bridges which have an undulating pattern.

To avoid a possible detachment of an information disc from the retaining device in such housings, in an embodiment of the invention at least part of the clamping studs are fixedly interconnected at their free ends while retaining their radial resilience. This is in principle the application of the construction described above and known per se to a housing in which the retaining device is capable of accommodating at least two information discs. This is particularly favourable in such retaining devices because these retaining devices in general comprise fewer clamping elements for retaining each of the information discs to be retained, and are accordingly more prone to failure than retaining devices which retain only a single information disc and accordingly comprise more clamping elements for this information disc. The construction according to the invention also reduces the risk of fracture of the clamping studs in the case of impacts.

Since the uppermost information disc is most at risk of being detached from the retaining device, an embodiment of the invention is characterized in that those clamping studs of the group are interconnected whose clamping surfaces lie farthest to the outside. This means that the uppermost information disc is particularly well secured and thus also constitutes a stop device for the lower information discs.

An embodiment of the invention is characterized in that the clamping studs are connected to a plate via elastic connection bridges. These elastic connection bridges render possible a simple placement of the information discs, during which the clamping studs give way radially inwards and snap back again after the placement has been completed, so that the radially outermost clamping surfaces bear on the inside walls of the central hole of each information disc. Detaching is done in reverse order, a slight pressure on the plate being exerted. A ring may be used instead of the plate.

An embodiment of the invention is characterized in that the elastic connection bridges have an undulating profile or S-profile. These profiles can be simply manufactured and also render possible an elastic connection between the clamping studs and the plate or ring in a simple manner.

A simple manufacture is achieved in a further embodiment of the invention in that the clamping studs, possibly in conjunction with the elastic connection bridges, are integral with the plate.

An improvement in the quality of the retaining device is achieved in that at least the clamping studs of one group are interconnected. Such a construction already gives the total retaining device the required stability. This group preferably is, as stated above, that group whose clamping surfaces lie axially farthest away from the base surface of the housing.

DESCRIPTION OF THE PREFERRED EMBODIMENTS

Figure 1:
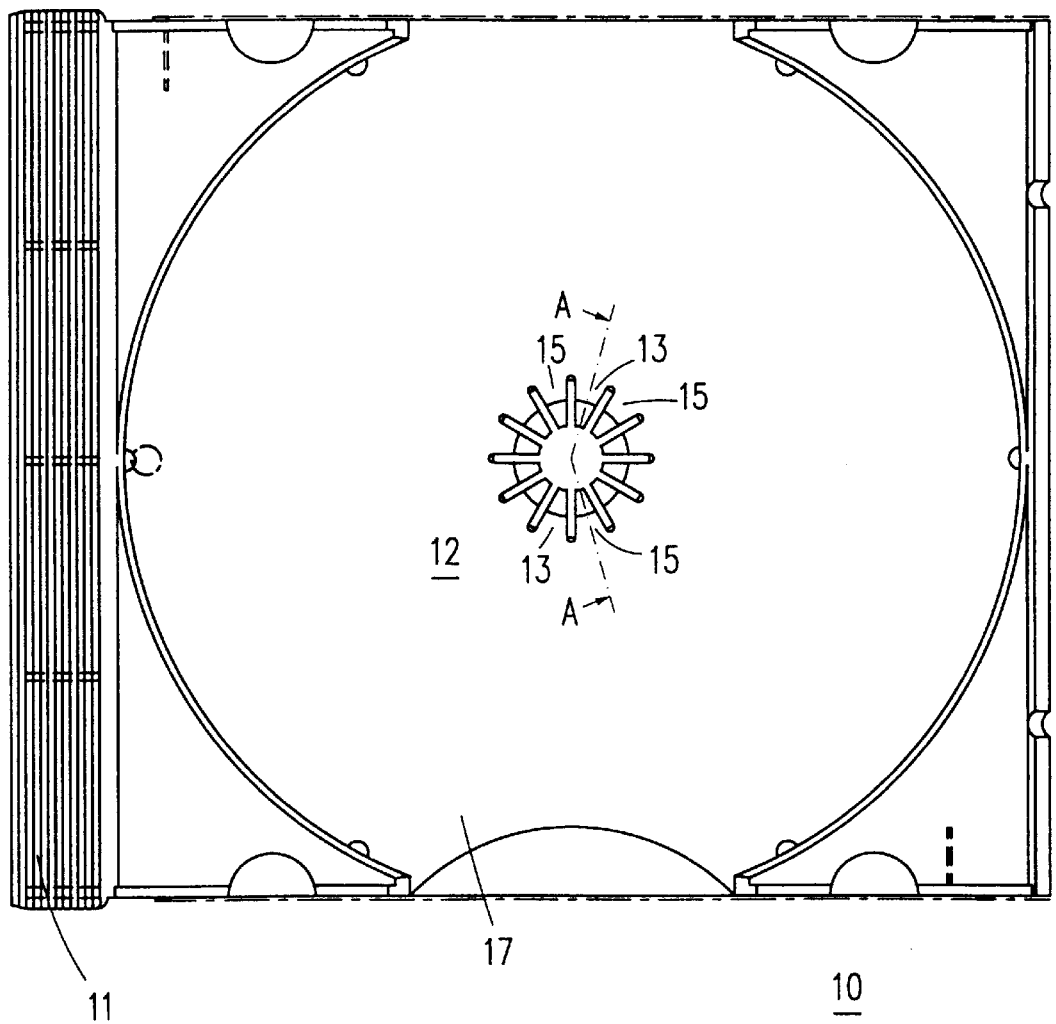
FIG. 1 is a plan view of a tray with a central retaining device for several CDs, without CDs being inserted.

The tray 10 shown in FIG. 1 is normally inserted into a bottom part of a housing which may subsequently be closed with a lid hinged to the bottom part. Such housings are diagrammatically shown further down in FIGS. 4 to 6. The tray 10 of FIG. 1 has a side grip 11 and a central retaining device 12. The retaining device 12 in FIGS. 1 and 2 comprises two groups of clamping studs arranged in a circle, i.e. a first group of six clamping studs 13 for holding and clamping a first CD 14 and a second group of six clamping studs 15 for holding and clamping a second CD 16. The clamping studs 13 and 15 alternate along the circumference of the retaining device 12.

Figure 3A:
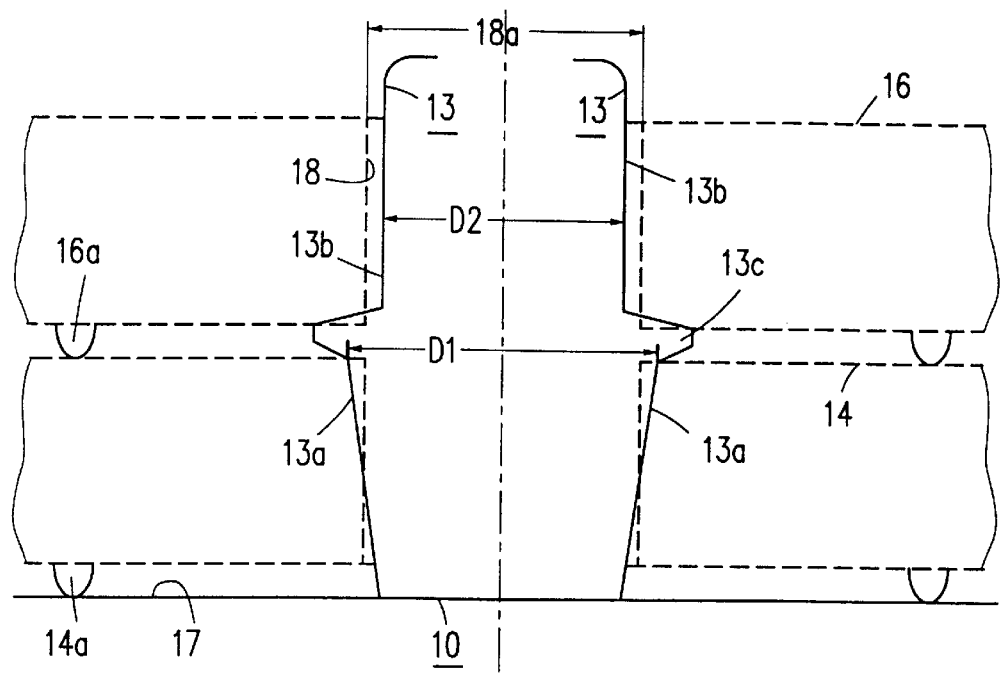

FIG. 3A shows a cross-section, not true to scale, of two mutually opposed clamping studs 13 from the first group. These studs have clamping surfaces 13a adjacent the surface 17 of the tray 10 and narrowing conically towards the surface 17. The maximum outer diameter $D_1$ of these clamping surfaces 13a in the non-clamped state is a little greater than the diameter 18a of the central opening 18 of the CDs 14 or 16. By contrast, the outer diameter $D_2$ of the straight surfaces 13b of the clamping studs 13 situated above the clamping surfaces 13a is smaller than the diameter 18a of the central opening 18, so that said surfaces 13b do not interfere with the clamping of the second CD 16. A radial ridge 13c is provided between the surfaces 13a and 13b of a diameter greater than the diameter of the central opening 18. This ridge 13c serves to provide a better seat for the CD 14.

Figure 2:
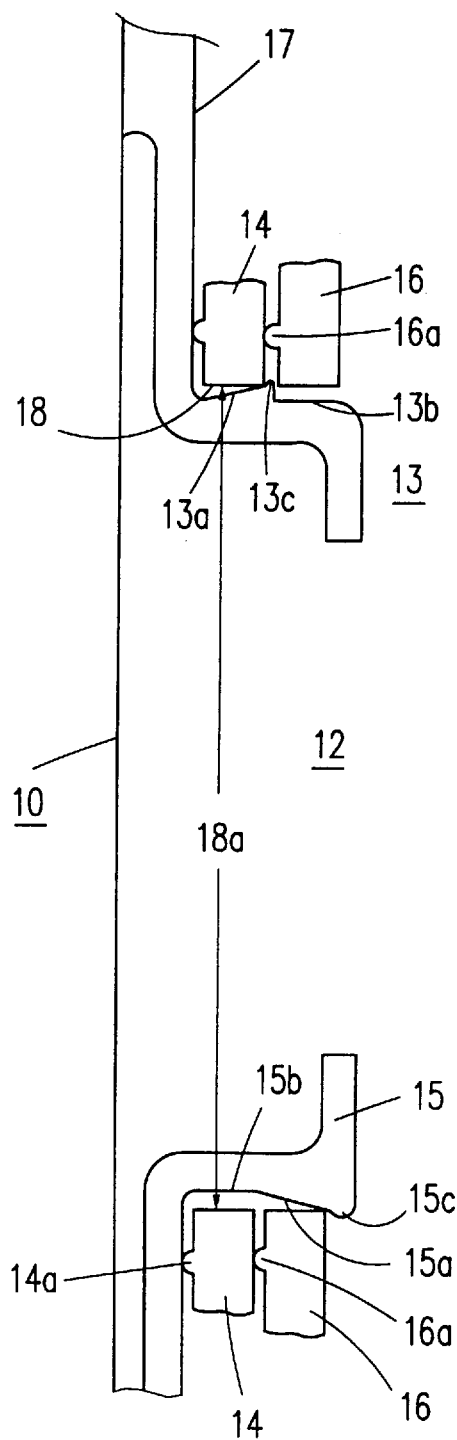
FIG. 2 is a cross-section taken on the line A—A in FIG. 1 on an enlarged scale, with two CDs being retained, FIGS. 3A and B are two enlarged diagrammatic pictures of the clamping region for clamping two CDs.
Figure 3B:
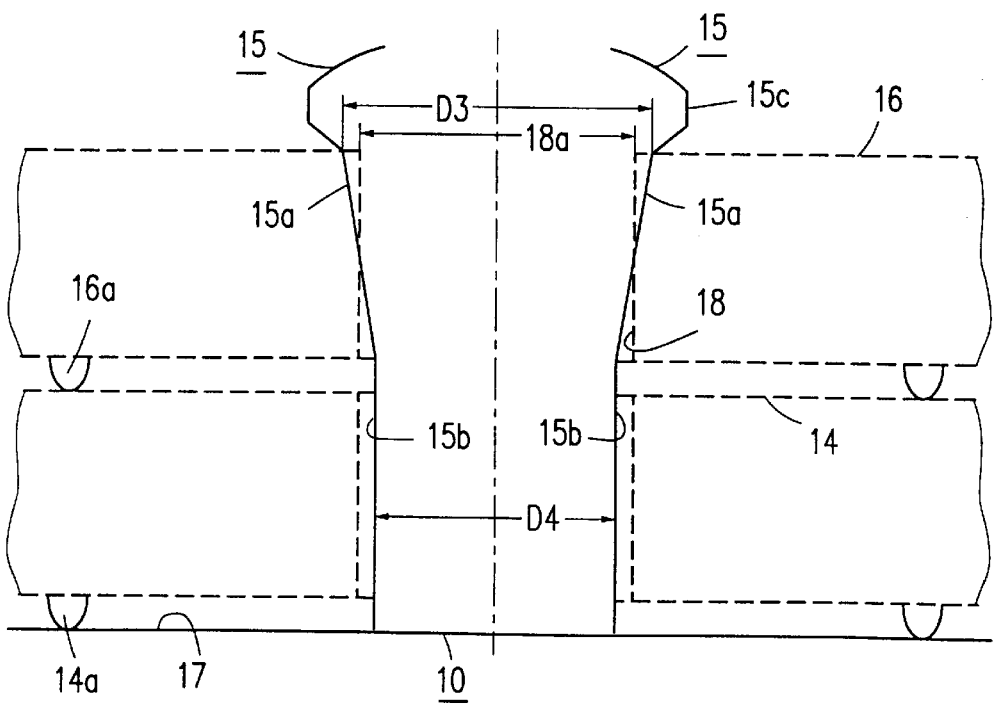

FIG. 3B is a diagrammatic cross-section of two mutually opposed clamping studs 15 from the second group. The radially resilient clamping studs 15 also have clamping surfaces 15a which narrow conically towards the surface 17 of the tray 10, and surfaces 15b adjoining the former surfaces and directed perpendicularly to the surface 17. The clamping surfaces 15a here serve to clamp the CD 16 which lies on the CD 14. The same holds for the dimensions of the diameters of the conical clamping surfaces 15a and the straight surfaces 15b as discussed for the surfaces 13a and b described above, i.e. the greatest outer diameter $D_3$ of the clamping surfaces 15a is a little greater than the diameter 18a of the central CD opening 18. Furthermore, the outer diameter $D_4$ of the straight surfaces 15b is a little smaller than the diameter 18a. The clamping studs 15 have a radial ridge 15c above the CD 16, which serves to secure the CD 16 passed over the ridge 15c in its position. The tray 10 shown in FIGS. 1 to 3 has no elevation on its surface 17 for supporting CDs as was usual in prior art trays. Instead, the bottom CD 14 rests with its ring 14a directly on the surface 17 and the CD 16 rests with its ring 16a on the CD 14.

Figure 4:
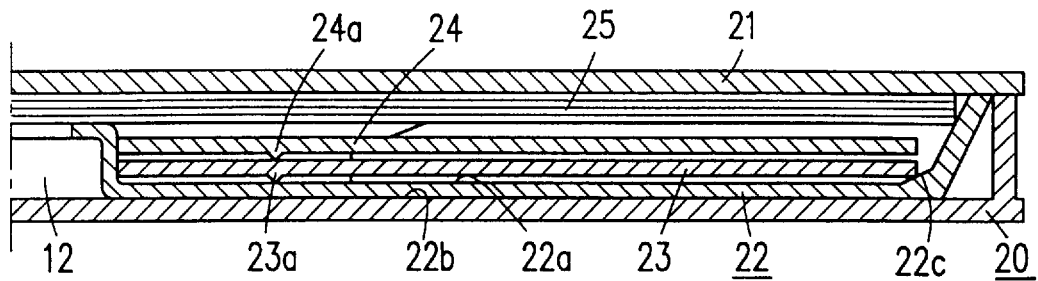
FIG. 4 shows in cross-section a side of a housing for accommodating two CDs.
Figure 5:
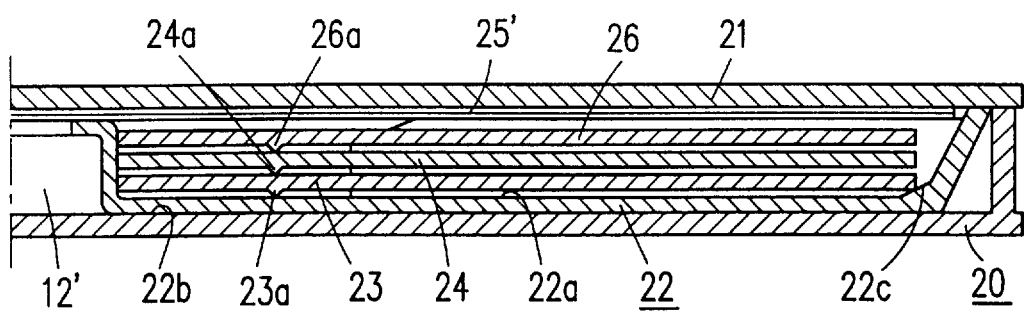
FIG. 5 shows the same housing as FIG. 4, but now accommodating three CDs.
Figure 6:
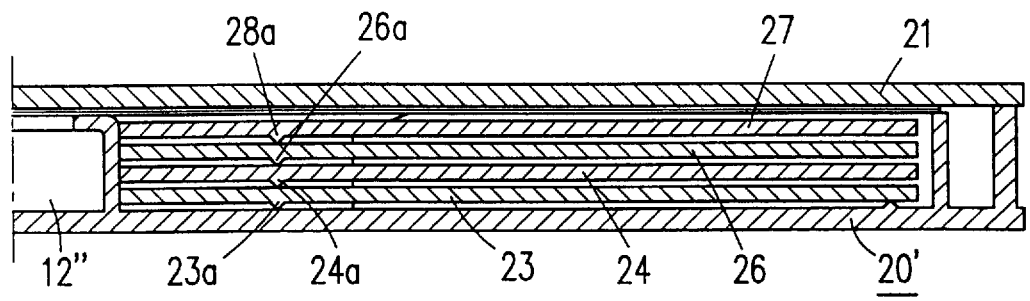
FIG. 6 shows the same housing as FIG. 4, now accommodating four CDs.

FIGS. 4, 5 and 6 show three embodiments of a single housing with the same external dimensions, comprising an identical bottom part 20 and a lid 21 hinged thereto, as evidenced by FIGS. 4 and 5. The bottom part 20' of FIG. 6 has a modified interior (see further below). The housing of FIGS. 4 to 6 has outer dimensions which correspond to those of commercially available CD packagings for holding a single CD. The embodiment of FIG. 4 differs from the commercially available embodiment of the housing in that the tray 22 arranged in the bottom part has a plane support surface 22a for a CD 23 while a raised central support is omitted, whereby space is gained for accommodating two CDs 23 and 24 which have respective raised rings 23a, 24a. A further space gain is achieved when the tray 22 bears with a flat surface 22b directly on the bottom part 20, in contrast to the prior art. The space for a text booklet 25 is sufficiently large. The retaining device 12 is constructed in accordance with the invention as shown in FIGS. 1 to 3, which is not depicted in detail here. The height of the retaining device 12 has not been changed compared with the known embodiment of the commercially available housing.

The embodiment of FIG. 5 differs from the known commercially available construction of the housing in that the tray 22 without a raised central support, as in FIG. 4, is given a plane support surface 22a for the bottom CD 23 and also bears with a plane outer surface 22b directly on the bottom part 20, as in FIG. 4. In this construction, moreover, the retaining device 12' has been lengthened in upward direction towards the lid 21, so that space is now available for accommodating a further CD 26, which, however, has reduced the space available for holding a booklet 25', which has been made thinner.

The embodiment of FIG. 6 again does not differ from the commercially available housing in its outer dimensions, but no separate tray is provided in this embodiment; instead, the bottom part 20' itself is provided with the retaining device 12", which here projects to immediately below the lid 21. This provides sufficient space for holding four CDs 23, 24, 26, 27 in one housing which had originally been designed for a single CD. The retaining device 12" is again provided with resilient clamping studs according to the invention, as shown in FIGS. 1 to 3, i.e. in this embodiment with four groups of at least three clamping studs each.

Figure 7:
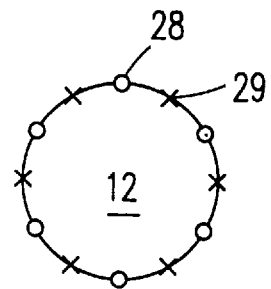
FIGS. 7 to 9 show clamping studs as used in FIGS. 4 to 6 arranged in circle.
Figure 8:
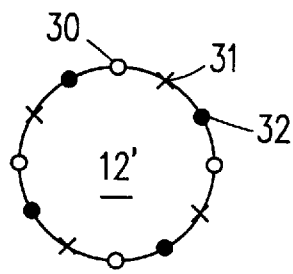
Figure 9:
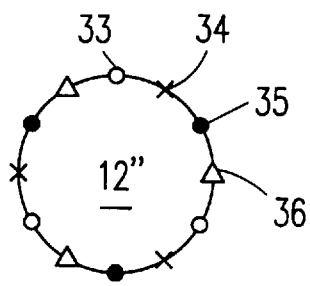

FIGS. 7 to 9 diagrammatically show the clamping devices 12, 12', 12" from FIGS. 4 to 6, each with twelve clamping studs. The construction of FIG. 7 comprises two groups of six clamping studs 28, 29, each for holding two CDs, corresponding to the embodiment of FIGS. 3A and B. The construction of FIG. 8 comprises three groups of four clamping studs 30 . . . 32 each for holding three CDs, and the construction of FIG. 9 comprises four groups of three clamping studs 33 . . . 36 each for holding four CDs.

Figure 10:
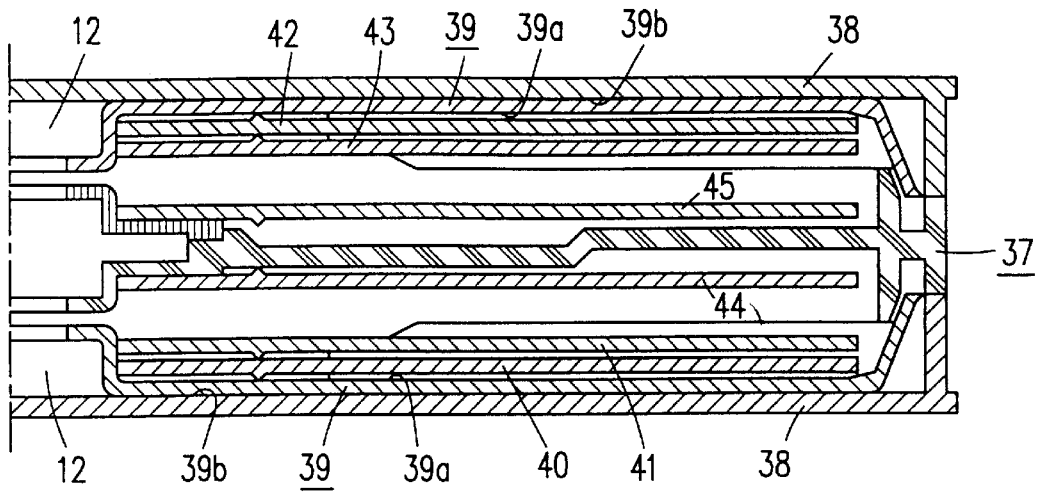
FIG. 10 is a cross-section of a housing for accommodating six CDs.
Figure 11:
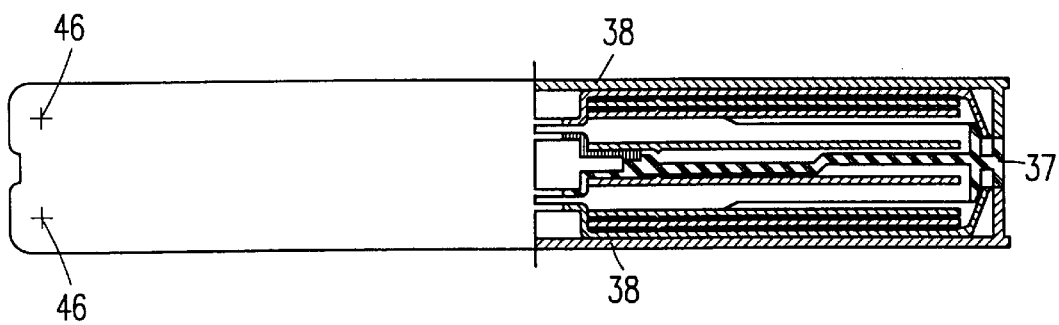
FIG. 11 shows the complete housing of FIG. 10.

FIG. 10 shows the right-hand side of a housing for a total of six CDs. The housing has a central part 37 and two identical lid parts 38 which are hinged to the central part. The hinges for the lids 38 are arranged, as in the embodiments of FIGS. 4 to 6, in the left-hand part of the housing as shown in FIG. 11. The external dimensions of the housing of FIG. 10 correspond exactly to those of the similar commercially available housing which is suitable for holding no more than four CDs, i.e. one CD on each lid part 38 and two CDs on the central part 37. According to the invention, this housing is now so constructed that the two identical lid parts 38 are formed so as to correspond to the construction of FIG. 4. This means that the two lid parts 38 each accommodate a tray 39 which has a plane support surface 39a without a raised central support and which rests on the relevant lid part 38 also with a plane support surface 39b. So much space is gained thereby that two CDs 40, 41; 42, 43 can be accommodated in each lid part 38. Two further CDs 44, 45 can be accommodated on the central part 37 in conventional manner, as in the known housing, so that the housing can now hold a total of six CDs. The centrally arranged clamping device 12 of each lid part is constructed in accordance with the embodiment of FIGS. 4 and 7, i.e. each clamping device 12 comprises two groups of clamping studs 28, 29 for retaining two CDs.

FIG. 11 shows the construction of FIG. 10, the left-hand part of the housing with the two hinges 46 for the lids 38 being drawn here. The housings of FIGS. 4, 5, 6 are of the same construction on the left-hand side.

Figure 12:
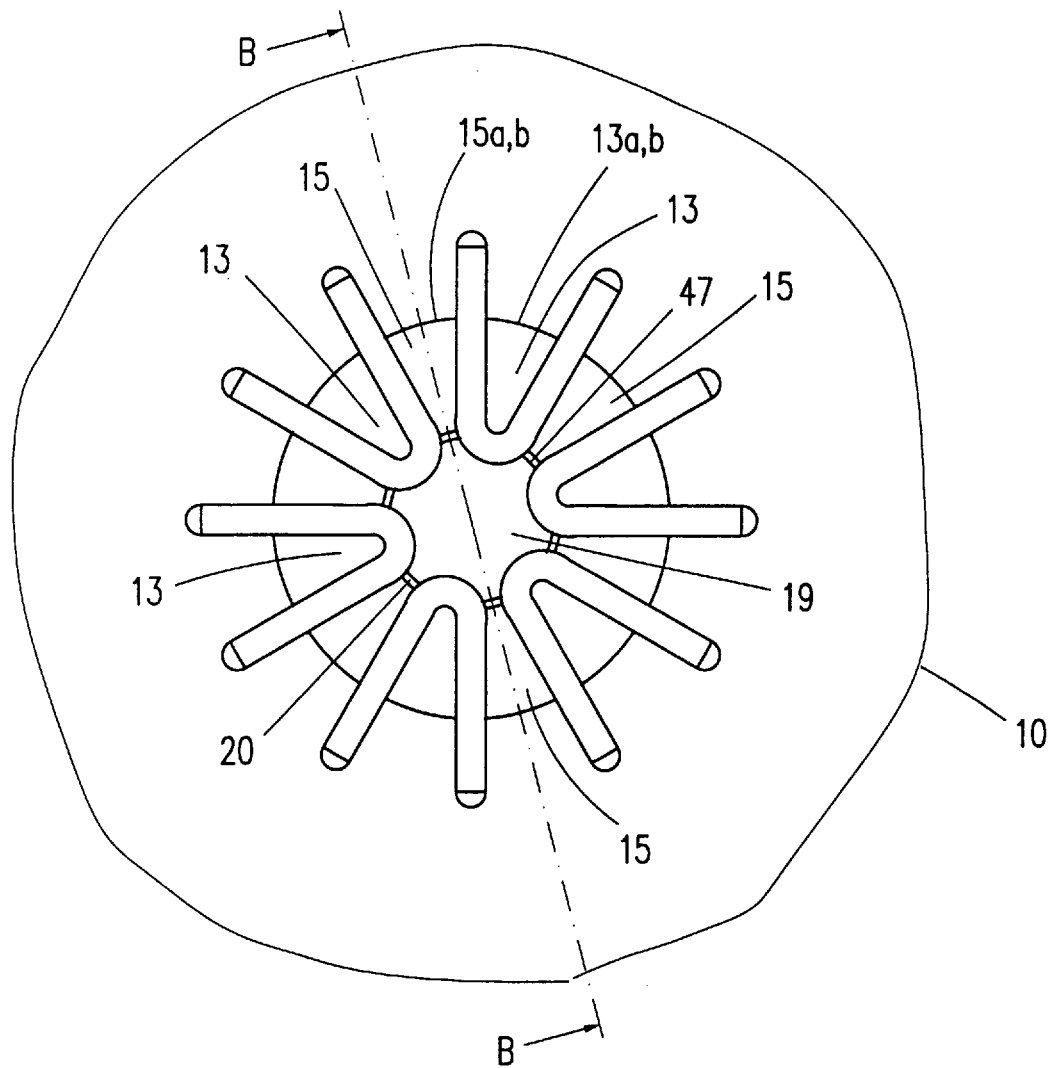
FIG. 12 shows a retaining device according to FIG. 1 on a larger scale, with a plate arranged between clamping studs.
Figure 13:
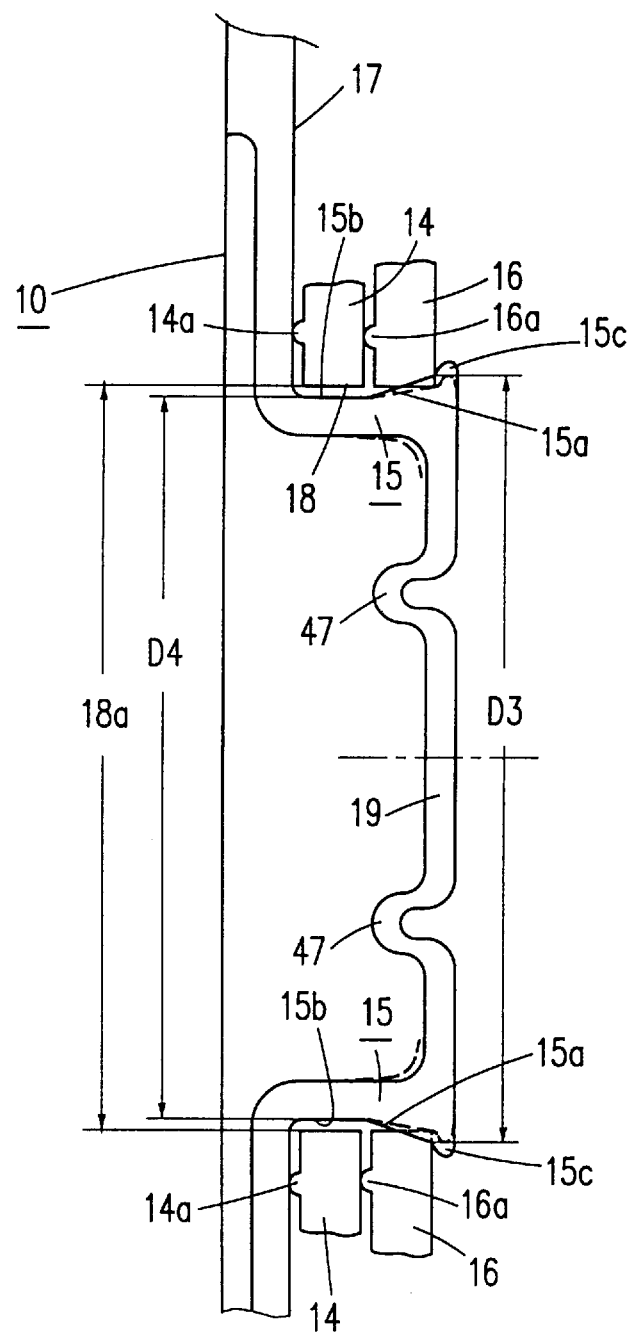
FIG. 13 is a cross-section taken on the line B—B in FIG. 12.

In FIG. 12, the clamping studs 15 of the second group are interconnected by a rigid plate 19, S-shaped connection bridges 47 (see FIG. 13) being provided between the free ends of the clamping studs 15 and the plate 19 for providing a degree of elasticity.

When the first CD 14 is inserted, the clamping elements 15 are first pressed together, and subsequently the CD 14 is held by the clamping surfaces 13a of the clamping elements 13. Then the second CD 16 is inserted, which does not affect the clamping elements 13, but only bends the clamping elements 15 inwards, so that the CD 16 after being inserted will be held by the clamping surfaces 15a.

We claim:

1. A housing for securing a stack of at least two information discs, each information disc having a circular central opening of a given diameter, the housing including a base plate (10, 17) and a retaining device (12) centrally located on said base plate; said retaining device comprising:

a plurality of clamping studs (13, 15) arranged in a circle and divided into at least two different groups, those in each different group having clamping surfaces (13a, 15a) in a different respective plane;

the clamping studs (13, 15) being resilient in a radial direction so that the clamping surfaces (13a, 15a) of each group of clamping studs will securely engage the central opening of an information disc (14, 16) which is placed thereon and is in the plane relevant to said group;

the clamping surfaces (13a, 15a) being tapered in a direction toward said base plate (10, 17), so that the clamping surfaces of clamping studs which are diametrically opposed have a maximum diametrical distance there-between ($D_1$, $D_3$) which is slightly greater than the diameter of the circular central opening (18) of an information disc; and the clamping studs in each group also having non-clamping surfaces (13b, 15b) which adjoin the clamping surfaces (13a, 15a) of an adjoining group of clamping studs and extend perpendicular to said base plate (10, 17), the non-clamping surfaces of diametrically opposed clamping studs in a given group having a diametrical distance there-between which is slightly smaller than the diameter of the circular central opening (18) of an information disc.

2. A housing as claimed in claim 1, wherein each ends of the clamping surfaces (13a, 15a) of each group of clamping studs (13, 15) are provided with radial ridges (13c, 15c), the diametrical distance between diametrically opposed radial ridges being somewhat greater than the diameter of the circular central opening (18) of an information disc.

3. A housing as claimed in claim 1, wherein the clamping studs (13, 15) of different groups are interweaved one after the other in regular alternation around the circumference of said circular arrangement thereof.

4. A housing as claimed in claim 1, further comprising: a lid (21), a bottom part (20) to which said lid is hinged, and a tray (22) in said bottom part (20), which tray (22) is formed so as to serve as said base plate (10, 17) on which the central retaining device (12) is supported.

5. A housing as claimed in claim 4, wherein the tray (22) has a planar support surface (22a) for a bottom information disc in said stack and a planar outer surface (22b) which rests against said bottom part (20).

6. A housing as claimed in claim 4, wherein the tray (22) has in a peripheral region thereof a projecting portion (22c) for supporting an edge of an information disc lying on said tray.

7. A housing as claimed in claim 1, wherein some of the clamping studs (15) in at least one of said groups are fixedly interconnected at free ends thereof.

8. A housing as claimed in claim 7, wherein the clamping studs (15) which are interconnected are those having clamping surfaces (15a) which lie in the plane which is farthest from said base plate (10, 17).

9. A housing as claimed in claim 7, wherein the clamping studs (15) which are interconnected are connected to a plate (19) via elastic S-shaped connection bridges (47).

10. A housing as claimed in claim 9, wherein the clamping studs (15) which are interconnected form an integral assembly with said plate (19).

11. A housing as claimed in claim 1, further comprising a bottom part (20') and a lid (21) hinged to said bottom part, which bottom part constitutes the base plate (10, 17) on which the central retaining device (12") is supported, and the clamping studs of said retaining device extend from the base plate to just below said lid (21).

12. A housing as claimed in claim 1, further comprising a central part (37), two identical lid parts (38) hinged to said central part, and trays (39) inserted into each of the lid parts, said trays serving as base plates (10, 17) which each have a retaining device (12) centrally supported thereon.

13. A housing as claimed in claim 12, wherein said trays (39) each have a plane support surface (39a) for supporting a bottom information disc in said stack and a plane outer surface (39b) which adjoins one of said lid parts (38).

* * * * *